(12) United States Patent
Hutchins

(10) Patent No.: US 9,932,880 B2
(45) Date of Patent: Apr. 3, 2018

(54) GASKET AND SYSTEM FOR CONTROL OF THE TEMPERATURE OF AN ENGINE

(71) Applicant: JAGUAR LAND ROVER LIMITED, Warwickshire (GB)

(72) Inventor: William Hutchins, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 14/767,618

(22) PCT Filed: Feb. 11, 2014

(86) PCT No.: PCT/EP2014/052648
§ 371 (c)(1),
(2) Date: Aug. 13, 2015

(87) PCT Pub. No.: WO2014/124937
PCT Pub. Date: Aug. 21, 2014

(65) Prior Publication Data
US 2015/0345364 A1    Dec. 3, 2015

(30) Foreign Application Priority Data
Feb. 13, 2013 (GB) .................................. 1302498.9

(51) Int. Cl.
*F02F 1/24* (2006.01)
*F01P 3/02* (2006.01)
(Continued)

(52) U.S. Cl.
CPC ................. *F01P 3/02* (2013.01); *F01P 7/164* (2013.01); *F02F 11/002* (2013.01);
(Continued)

(58) Field of Classification Search
CPC ........... F02F 2001/249; F02F 1/38; F02F 1/40
(Continued)

(56) References Cited

U.S. PATENT DOCUMENTS 4,300,273 A    11/1981  Lockhart
4,423,705 A    1/1984   Morita et al.
(Continued)

FOREIGN PATENT DOCUMENTS

DE    10011143 A1    9/2001
DE    102004049292 A1    4/2006
(Continued)

OTHER PUBLICATIONS

International Search Report for International application No. PCT/EP2014/052648 dated Apr. 23, 2014.

*Primary Examiner* — Jacob Amick
*Assistant Examiner* — Charles Brauch
(74) *Attorney, Agent, or Firm* — Carlson, Gaskey & Olds

(57) ABSTRACT

A vehicle comprising an engine having a cylinder block, a cylinder head and a gasket disposed between the cylinder block and the cylinder head. The cylinder block and the cylinder head each comprising at least one bore opening leading to a casting bore within the cylinder block and cylinder head respectively. The gasket comprising a gasket opening having a control gap, said gasket opening being sized and arranged to provide a fluid pathway between the bore opening in the cylinder block and the bore opening in the cylinder head. The control gap being configured and arranged to selectively restrict that fluid pathway such that gas may freely pass through the cylinder block bore opening and into the bore opening in the cylinder head whereas coolant can only restrictively pass through the cylinder block bore opening and into the bore opening in the cylinder head.

21 Claims, 11 Drawing Sheets

(51) Int. Cl.
  *F01P 7/16*   (2006.01)
  *F02F 11/00*  (2006.01)
  *F16J 15/06*  (2006.01)
  *F16J 15/08*  (2006.01)
  *F02F 1/38*   (2006.01)
  *F02F 1/40*   (2006.01)
  *F01P 11/02*  (2006.01)

(52) U.S. Cl.
  CPC ......... *F16J 15/064* (2013.01); *F16J 15/0825* (2013.01); *F01P 11/0285* (2013.01); *F01P 2003/024* (2013.01); *F01P 2003/027* (2013.01); *F01P 2003/028* (2013.01); *F02F 1/38* (2013.01); *F02F 1/40* (2013.01); *F02F 2001/249* (2013.01); *F16J 2015/0868* (2013.01)

(58) Field of Classification Search
  USPC ........................................ 123/41.8
  See application file for complete search history.

(56) References Cited

U.S. PATENT DOCUMENTS

| | | | | |
|---|---|---|---|---|
| 5,022,662 A | * | 6/1991 | Yasui | F01P 3/02 |
| | | | | 277/599 |
| 2005/0279295 A1 | * | 12/2005 | Vialard | F01P 7/14 |
| | | | | 123/41.74 |
| 2006/0090714 A1 | * | 5/2006 | Fricke | F16J 15/0825 |
| | | | | 123/41.82 R |
| 2010/0326380 A1 | | 12/2010 | Fedeson et al. | |

FOREIGN PATENT DOCUMENTS

| | | |
|---|---|---|
| JP | H04347324 A | 12/1992 |
| JP | H084900 A | 1/1996 |
| JP | 2010043555 | 2/2010 |
| WO | 80/00865 | 5/1980 |

* cited by examiner

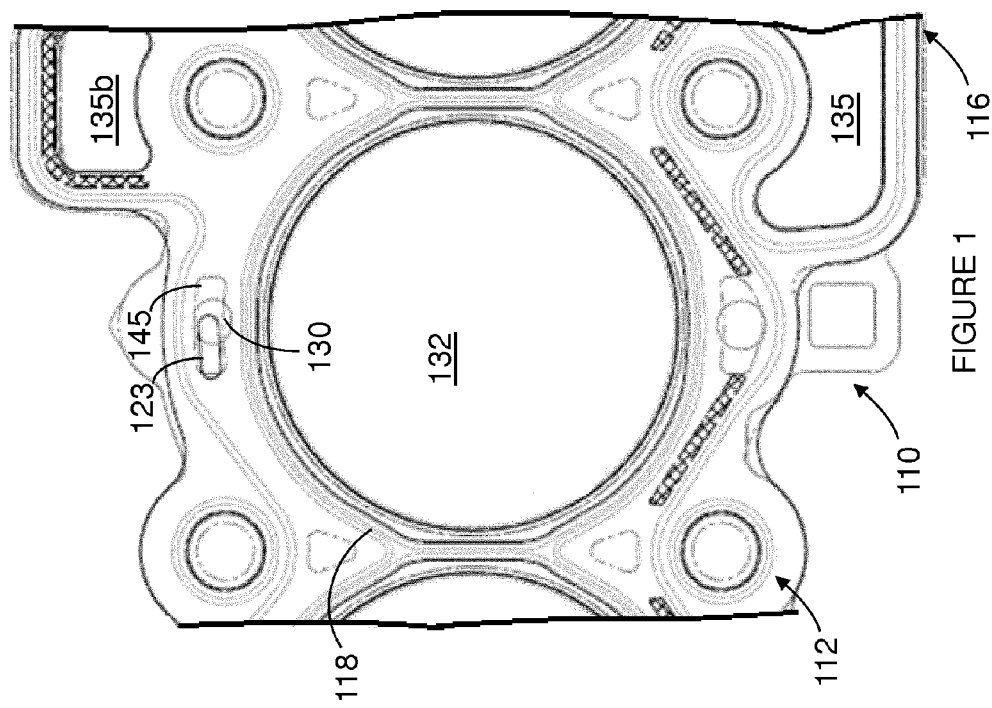

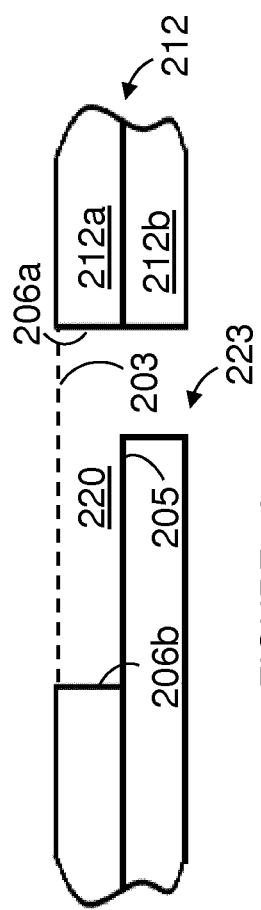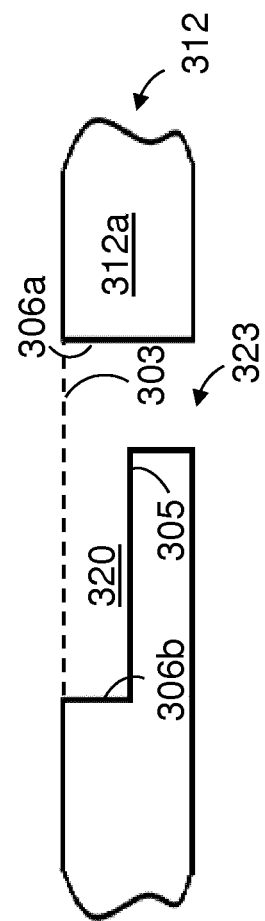

GASKET AND SYSTEM FOR CONTROL OF THE TEMPERATURE OF AN ENGINE

TECHNICAL FIELD

The present invention relates to a gasket for an engine and to a system, comprising the gasket for controlling the temperature of the engine. More specifically, but not exclusively, the invention relates to a gasket having a control gap configured and arranged to restrictively permit the flow of coolant between the cylinder block and the cylinder head and to permit the free flow of gas between the cylinder block and the cylinder head. Further specifically, but not exclusively, the present invention relates to a split cooling system comprising the gasket, which system provides a warm-up phase for one or more components of the engine (such as, but not limited to, lubricant, one or more cylinders and/or a cylinder head and/or a cylinder block) by limiting or otherwise controlling the amount of cooling conducted by the system during the warm-up phase.

Aspects of the invention relate to a vehicle, to a method, to a gasket and to a program.

BACKGROUND

A gasket (also referred to as a head gasket) is disposed between a cylinder block (also referred to as an engine block) and a cylinder head in an internal combustion engine. The gasket is provided to seal around the cylinders, oil passage openings and coolant passage openings. Coolant flow around a water jacket is used to cool the engine block and other components including the cylinders, pistons, piston rings and lubricant for the pistons. Gaskets are made to accommodate a particular engine design and have sealing openings for the cylinders, oil passage opening(s) and water passage opening(s) as well as other apertures or openings, for example, for enabling the gasket to be fixed to the cylinder block (for example using bolts).

Cylinder blocks and cylinder heads are typically cast components and can comprise additional redundant casting legs or bores that are formed during the casting process. These redundant legs are formed as bores or holes and are disposed proximate to the junction between the cylinder head and cylinder block. Whereas these redundant legs could be filled, blocked or otherwise sealed, to do so would incur additional manufacturing cost. If left unblocked, then gas and/or coolant liquid may collect in these redundant casting legs. Openings of the cast legs at the surface of the cylinder block and cylinder head provide a point of egress or ingress for coolant liquid and/or gas out of and into the redundant casting legs. With increasing temperature of the engine, the pressure of the coolant and gas in these redundant casting bores or legs can increase to such a level that uncontrolled leaking may occur. Such leakage may have a detrimental effect on the operation and service life of the engine.

During manufacture the size, shape and location of the redundant casting legs (bores) and their surface openings in the cylinder block and cylinder head are subject to tolerances. The exact size, shape and location of the surface openings of the redundant casting legs is not known until after manufacture. Due to these manufacturing tolerances, an opening of a leg cast in the cylinder head may not be aligned with or superimposed exactly above a corresponding opening of a leg cast in the cylinder block. Indeed, the opening in the cylinder head and the opening in the cylinder block may be off-set from one another and may only partially overlap or indeed not overlap at all.

Typically, known cooling systems for internal combustion engines comprise a pump driven by the engine. Because the cooling system is driven by the engine, the cooling system is operated as soon as the engine is operated. However, for optimum fuel efficiency and to minimise wear on components of an engine, it is better for an engine to operate when it is warm. Operating the cooling system as soon as the engine is initiated, extends the time taken for the engine to warm up and reach an optimum operating temperature. This operation therefore reduces the fuel efficiency of the engine, as well as reducing the service life of the engine. Of particular importance is the temperature of lubricant about the pistons and piston rings. Operation of the engine when the lubricant is below an optimum temperature may have a deleterious effect on the engine.

The invention seeks to provide an improved gasket which addresses or at least mitigates the problems associated with known gaskets. The invention also provides an improved cooling system for an engine that utilises the gasket in combination with a controllable pump. The invention may have advantageous application outside of engines for motor vehicle applications, for example, but not limited to, application in engines for generators.

As used herein the term coolant is used to refer to any suitable temperature management liquid, such as, but not limited to, water, coolant (for example ethylene glycol) and a water and coolant mixture. Upon reading the following description it will be recognised that the terms, "coolant" and "water" are used to refer to liquid and/or fluid that is recirculated to cause cooling of an engine. Additionally, in an advantageous aspect of the disclosure the coolant is maintained at a zero or very low flow-rate to allow warming of an engine to occur. As such the term "coolant" is not intended to be limited to a substance or liquid that causes a reduction in temperature, but rather, and as appropriate, is intended to additionally refer to a liquid or substance that causes or allows for an increase in temperature or maintenance of temperature.

SUMMARY

Aspects of the invention provide a gasket, a method, a program and a vehicle as claimed in the appended claims.

According to an aspect of the invention for which protection is sought, there is provided a vehicle comprising an engine having a cylinder block, a cylinder head and a gasket disposed between the cylinder block and the cylinder head, the cylinder block and the cylinder head each comprising at least one bore opening leading to a bore within the cylinder block and cylinder head respectively, the gasket comprising a gasket opening, said gasket opening being sized and arranged to provide a pathway for fluid between the bore opening in the cylinder block and the bore opening in the cylinder head and the gasket comprising means for selectively restricting said pathway for fluid such that gas may freely pass through the cylinder block bore opening and into the bore opening in the cylinder head whereas coolant can only restrictively pass through the cylinder block bore opening and into the bore opening in the cylinder head.

Optionally, said means is a control gap.

Optionally, the control gap in the gasket opening comprises an upper wall, a lower wall and side walls, the height of the control gap is defined by the distance between the upper wall and the lower wall and wherein the height of the control gap is dimensioned such that during certain operating temperatures, the viscous drag of coolant passing between the upper and lower walls is significant enough to prevent or at least minimise the flow of coolant out of the gasket opening and into the opening of the cylinder head. Where the distance between the upper wall and lower wall is non-uniform, the height may be defined as the maximum height, the minimum height or the average height.

Optionally, the height of the control gap is less than or equal to about 0.7 mm.

Optionally, the height of the control gap is between about 0.2 mm and about 0.7 mm, or is about 0.3 mm.

Optionally, the upper wall of the control gap is provided by the cylinder head or an upper layer of the gasket and the lower wall of the control gap is provided by the cylinder block or a lower layer of the gasket.

Optionally, the gasket comprises three or more layers, at least in the proximity of the gasket opening, wherein a first layer is disposed above an intermediate layer and the intermediate layer is disposed above a second layer, wherein the upper wall of the control gap is provided by the cylinder head; the side walls of the control gap are provided by the first layer; and the bottom wall of the control gap is provided by the intermediate layer of material.

Optionally, the gasket comprises three or more layers, at least in the proximity of the gasket opening, wherein a first layer is disposed above an intermediate layer and the intermediate layer is disposed above a second layer and wherein the upper wall of the control gap is provided by the intermediate layer of material; the side walls of the control gap are provided by the second layer of material; and the bottom wall of the control gap is provided by the cylinder block.

Optionally, the gasket opening comprises two regions either or both of which may operate as the control gap in dependence upon the relative positioning of the bore opening in the cylinder head and the bore opening in the cylinder block, wherein a first control gap comprises: an upper wall provided by the cylinder head; side walls provided by the first layer; and a bottom wall provided by the intermediate layer of material, and wherein a second control gap comprises: an upper wall provided by the intermediate layer of material; side walls provided by the second layer of material; and a bottom wall provided by the cylinder block.

Optionally, the gasket comprises a single layer of material and the upper wall of the control gap is provided by the cylinder head and the lower wall of the control gap is provided by a recessed portion of the single layer of the gasket. The sides of the control gap are provided by the single layer of material.

Optionally, the gasket comprises a single layer of material and the upper wall of the control gap is provided by a recessed portion of the single layer of the gasket and the lower wall of the control gap is provided by the cylinder block.

Optionally, the gasket comprises first and second layers of material, wherein the first layer is disposed on top of the second layer and the upper wall of the control gap is provided by the cylinder head; the side walls of the control gap are provided by the first layer of material; and the lower wall of the control gap is provided by an upper surface of the second layer of material.

Optionally, the gasket comprises first and second layers of material, wherein the first layer is disposed on top of the second layer and the upper wall of the control gap is provided by a lower surface of the first layer of material; the side walls of the control gap are provided by the second layer of material; and the lower wall of the control gap is provided by the cylinder block.

Optionally, the gasket opening has an upper portion and a lower portion and wherein the shape of the gasket opening at one or both of said upper and lower portions is generally elongate in order to connect the at least one bore opening in the cylinder block and the at least one bore opening in the cylinder head. In this way, irrespective of the exact location of the block and head openings, the gasket is shaped, arranged and configured to provide a connection for fluid between the two openings (albeit the head and block opening must be formed within expected manufacturing tolerances).

Optionally, only the upper portion or the lower portion of the gasket opening is elongate in shape and wherein the other, lower or upper portion of the gasket opening is provided for connecting to the bore opening in either the cylinder block or head and is significantly smaller in width than the width of the control gap and/or is substantially circular in cross-section.

Optionally, the control gap has a cross-sectional shape that is at least substantially oval.

Optionally, the control gap has a cross-sectional shape comprising two parallel straight sides and two opposed semi-circular ends.

Optionally, the width of the control gap is at least twice as great as the height of the control gap.

Optionally, the width of the control gap is about ten times as great as the height of the control gap.

Optionally, the width of the control gap is between about 3 mm and about 5 mm.

Optionally, the width of the control gap is about 4 mm.

As a further optional feature, the vehicle may comprise a system for managing the temperature of the engine, the system, comprising:

(i) a pump, coupled to the cylinder head and cylinder block for pumping coolant, wherein the pump is controllable such that the flow rate of coolant within the system is adjustable; and (ii) a valve configured to restrict and permit the flow of coolant through the cylinder block and/or through the cylinder head;

wherein, the pump is controllable to operate at a first flow-rate during a first operating condition and during said first operating condition the valve restricts the flow of coolant through the cylinder block and the control gap of the gasket restricts the flow of coolant out of the cylinder block via the bore openings and thereby the system is configured to enable the engine to reach a first operating temperature.

Optionally, the pump has a maximum flow rate output and wherein the first flow-rate is lower than the maximum flow-rate.

Optionally, the first operating temperature is between about 70° C. and about 90° C.

Optionally, the system comprises:

(i) a first fluid pathway from the pump, through a first inlet into the cylinder block into one or more coolant passageways (water jackets) and bores comprised in the cylinder block and terminating at the valve in a closed state;

(ii) a second fluid pathway from the pump through a second inlet into the cylinder head, out of the cylinder head via a second outlet and returning to the pump; and (iii) a third fluid pathway from the pump, through the first inlet into the cylinder block, though one or more coolant passageways (water jackets) comprised in the cylinder block and out of a first outlet of the cylinder block though the open valve and returning to the pump and/or out of the cylinder block via the gasket and returning to the pump via at least part of the second fluid pathway;

wherein, during the first operating condition said valve is closed and only the first and second fluid pathways are accessible such that coolant is restricted from flowing out of the cylinder block;

wherein, the pump is controllable to operate at a second flow-rate during a second operating condition during which said valve is opened and the second and third fluid pathways are accessible such that coolant can flow into and out of the cylinder block; and wherein said first flow-rate is lower than said second flow-rate.

Optionally, at the lower flow-rate the viscous drag of coolant passing between the upper and lower walls is significant enough to prevent the flow of coolant out of the gasket opening and into the opening in the cylinder head.

Optionally, during the second operating condition, the cylinder block has a temperature at least substantially within an operating temperature range and by opening said valve and allowing coolant to flow into and out of the one or more coolant passageways (water jackets), the temperature of the cylinder head, cylinders and/or of the cylinder block is maintained at least substantially within the operating temperature range.

Optionally, the coolant is taken from the group consisting of: water, coolant, a mixture of water and coolant.

Optionally, any of the upper wall, lower wall and/or side walls is/are textured, formed, shaped, lumped, perturbed, or rough.

According to another aspect of the invention for which protection is sought, there is provided a method of controlling the passage of coolant through a gasket for an engine having a cylinder block and a cylinder head each comprising at least one bore opening leading to a bore within the cylinder block and cylinder head respectively, the method comprising:

(i) providing a gasket opening in the gasket that is sized and arranged to provide a fluid pathway between the bore opening in the cylinder block and the bore opening in the cylinder head;

(ii) forming a control gap that is configured and arranged to selectively restrict that fluid pathway such that gas may freely pass through the cylinder block bore opening and into the bore opening in the cylinder head whereas coolant can only restrictively pass through the cylinder block bore opening and into the bore opening in the cylinder head, wherein the control gap in the gasket opening comprises an upper wall, a lower wall and side walls, the height of the control gap being defined by the distance between the upper wall and the lower wall and wherein the height of the control gap is dimensioned such that during certain operating temperatures, the viscous drag of coolant passing between the upper and lower walls of the control gap is significant enough to prevent or at least minimise the flow of coolant out of the gasket opening and into the opening in the cylinder head.

Optionally, the height of the control gap is between about 0.2 mm and about 0.7 mm and optionally about 0.3 mm, and/or wherein the control gap is an elongate control gap.

Optionally, the control gap has a cross-sectional shape that is at least substantially oval comprising two at least substantially parallel straight sides and two opposed at least semi-circular ends and wherein the width of the control gap between the two parallel straight sides is between about 3 mm and about 5 mm and optionally about 4 mm.

According to yet another aspect of the invention for which protection is sought there is provided a method of controlling the temperature of an engine having a cylinder block and a cylinder head, the cylinder block and the cylinder head each comprising at least one bore opening leading to a bore within the cylinder block and cylinder head respectively, the method comprising:

(i) providing a gasket between the cylinder block and the cylinder head having an opening sized and arranged to provide a fluid pathway between the bore opening in the cylinder block and the bore opening in the cylinder head and having a control gap configured and arranged to restrict that fluid pathway such that gas may freely pass through the cylinder block bore opening and into the bore opening in the cylinder head whereas, in dependence upon temperature and flow-rate, coolant can only restrictively pass from the cylinder block bore opening, through the gasket control gap and into the bore opening in the cylinder head;

(ii) pumping coolant using a variably controllable pump, at a first flow-rate; and (iii) using a valve to restrict the flow of coolant through the cylinder block.

Optionally, the method may comprise:

(i) pumping coolant about first, second and third fluid pathways, wherein:
 a) the first fluid pathway is defined as: from the pump, through a first inlet into the cylinder block into one or more coolant passageways comprised in the cylinder block and terminating at a closed valve;
 b) the second fluid pathway is defined as: from the pump through a second inlet into the cylinder head, out of the cylinder head via a second outlet and returning to the pump; and
 c) the third fluid pathway is defined as: from the pump, through the first inlet into the cylinder block, though one or more coolant passageways comprised in the cylinder block and out of a first outlet of the cylinder block though an open valve and returning to the pump and/or out of the cylinder block via a gasket and returning to the pump via at least part of the second fluid pathway;

(ii) controlling the valve to select between closed and open conditions; and (iii) controlling the pump to operate at a first flow-rate during a first operating condition and during said first operating condition closing said valve such that only the first and second fluid pathways are accessible and such that coolant is restricted from flowing out of the cylinder block;

(iv) controlling the pump to operate at a second flow-rate during a second operating condition and during said second operating condition opening said valve such that the second and third fluid pathways are accessible and such that coolant can flow into and out of the cylinder block; and (v) wherein controlling the pump comprises making said first flow-rate lower than said second flow-rate to prevent flow of the coolant though the control gap in the gasket disposed between the cylinder head and cylinder block during the first operating condition of the system.

Optionally, at the lower first pump flow-rate, coolant cannot pass from the cylinder block, through the control gap in the gasket and out of the bore opening in the cylinder head.

Optionally, during the first operating condition, the cylinder block has a starting temperature below an operating temperature range and by restricting the flow of coolant using the valve and the control gap in the gasket opening, the cylinder block reaches a temperature at least substantially within the operating temperature range.

According to an even further aspect of the invention for which protection is sought, there is provided a gasket for an engine, the gasket comprising a gasket opening and being structured with a control gap or being structured to form a control gap when in situ between a cylinder head and cylinder block, said gasket opening being sized and arranged to provide a fluid pathway between a bore opening in a cylinder block and a bore opening in a cylinder head and said control gap being configured and arranged to selectively restrict that fluid pathway such that gas may freely pass through the opening in the gasket whereas coolant can only restrictively pass through the opening in the gasket.

Optionally, the control gap comprises an upper wall, a lower wall and side walls, the height of the control gap being defined by the distance between the upper wall and the lower wall and wherein the height of the control gap is dimensioned such that the viscous drag of coolant passing between the upper and lower walls is significant enough to prevent or at least minimise the flow of coolant out of the gasket opening and into an opening in a cylinder head.

Optionally, the height of the control gap is less than or equal to about 0.7 mm.

Optionally, the height of the control gap is between about 0.2 mm and about 0.7 mm.

Optionally, the maximum height of the control gap is about 0.3 mm.

Optionally, the upper wall of the control gap is provided by the cylinder head or an upper layer of the gasket and wherein the lower wall of the control gap is provided by the cylinder block or a lower layer of the gasket.

Optionally, the gasket comprises three or more layers, at least in the proximity of the gasket opening, wherein a first layer is disposed above an intermediate layer and the intermediate layer is disposed above the second layer and wherein the upper wall of the control gap is provided by the cylinder head; the side walls of the control gap are provided by the first layer; and the bottom wall of the control gap is provided by the intermediate layer of material.

Optionally, the gasket comprises three or more layers, at least in the proximity of the gasket opening, wherein a first layer is disposed above an intermediate layer and the intermediate layer is disposed above the second layer and wherein the upper wall of the control gap is provided by the intermediate layer of material; the side walls of the control gap are provided by the second layer of material; and the bottom wall of the control gap is provided by the cylinder block.

Optionally, the gasket opening comprises two regions either or both of which may operate as the control gap; in dependence upon the relative positioning of the bore opening in the cylinder head and the bore opening in the cylinder block, wherein the first control gap comprises: side walls provided by the first layer and a bottom wall provided by the intermediate layer of material and wherein the second control gap comprises: an upper wall provided by the intermediate layer of material and side walls provided by the second layer of material.

Optionally, the gasket comprises first and second layers of material, wherein the first layer is disposed on top of the second layer and the side walls of the control gap are provided by the first layer of material; and the lower wall of the control gap is provided by an upper surface of the second layer of material.

Optionally, the gasket comprises first and second layers of material, wherein the first layer is disposed on top of the second layer and the upper wall of the control gap is provided by a lower surface of the first layer of material; and the side walls of the control gap are provided by the second layer of material.

Optionally, the gasket opening has an upper portion, and a lower portion and wherein the shape of the gasket opening at one or both of said upper and lower portions is generally elongate in order to fluidally connect the at least one bore opening in the cylinder block and the at least one bore opening in the cylinder head.

Optionally, only the upper portion or the lower portion of the gasket opening is elongate in shape and wherein the other, lower or upper portion of the gasket opening is provided for connecting to the bore opening in either the cylinder block or head and is significantly smaller in width than the width of the control gap and/or is substantially circular in cross-section.

Optionally, the control gap has a cross-sectional shape that is at least substantially oval.

Optionally, the control gap has a cross-sectional shape comprising two parallel straight sides and two opposed semi-circular ends.

Optionally, the width of the control gap is at least twice as great as the height of the control gap.

Optionally, the width of the control gap is about ten times as great as the height of the control gap.

Optionally, the width of the control gap is between about 3 mm and about 5 mm.

Optionally, the width of the control gap is about 4 mm.

According to yet a further aspect of the invention, there is provided a program for installation in a vehicle for executing the method as described in the relevant foregoing paragraphs.

Within the scope of this application it is expressly intended that the various aspects, embodiments, examples and alternatives set out in the preceding paragraphs, in the claims and/or in the following description and drawings, and in particular the independent features thereof, may be taken independently or in any combination. For example, features described in connection with one embodiment are applicable to all embodiments unless such features are incompatible.

BRIEF DESCRIPTION OF THE DRAWINGS

Embodiments of the invention will now be described, by way of example only, with reference to the accompanying drawings, in which:

FIG. 1 is a plan view from the top of part of a gasket, wherein a line drawing of the gasket is shown in superposition above a line drawing of a cylinder block and a line drawing of a cylinder head is shown in superposition above the gasket;

FIG. 5A shows, schematically, in cross-section, a gasket opening and a control gap of a dual layer gasket according to yet a further embodiment;

FIG. 5B shows, schematically, in cross-section, a gasket opening and a control gap of a single layer gasket according to an even further embodiment;

DETAILED DESCRIPTION OF EMBODIMENTS

Detailed descriptions of specific embodiments of a temperature management system, a gasket and a vehicle comprising the system of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the temperature management system, the gasket and the vehicle comprising the system described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1A:
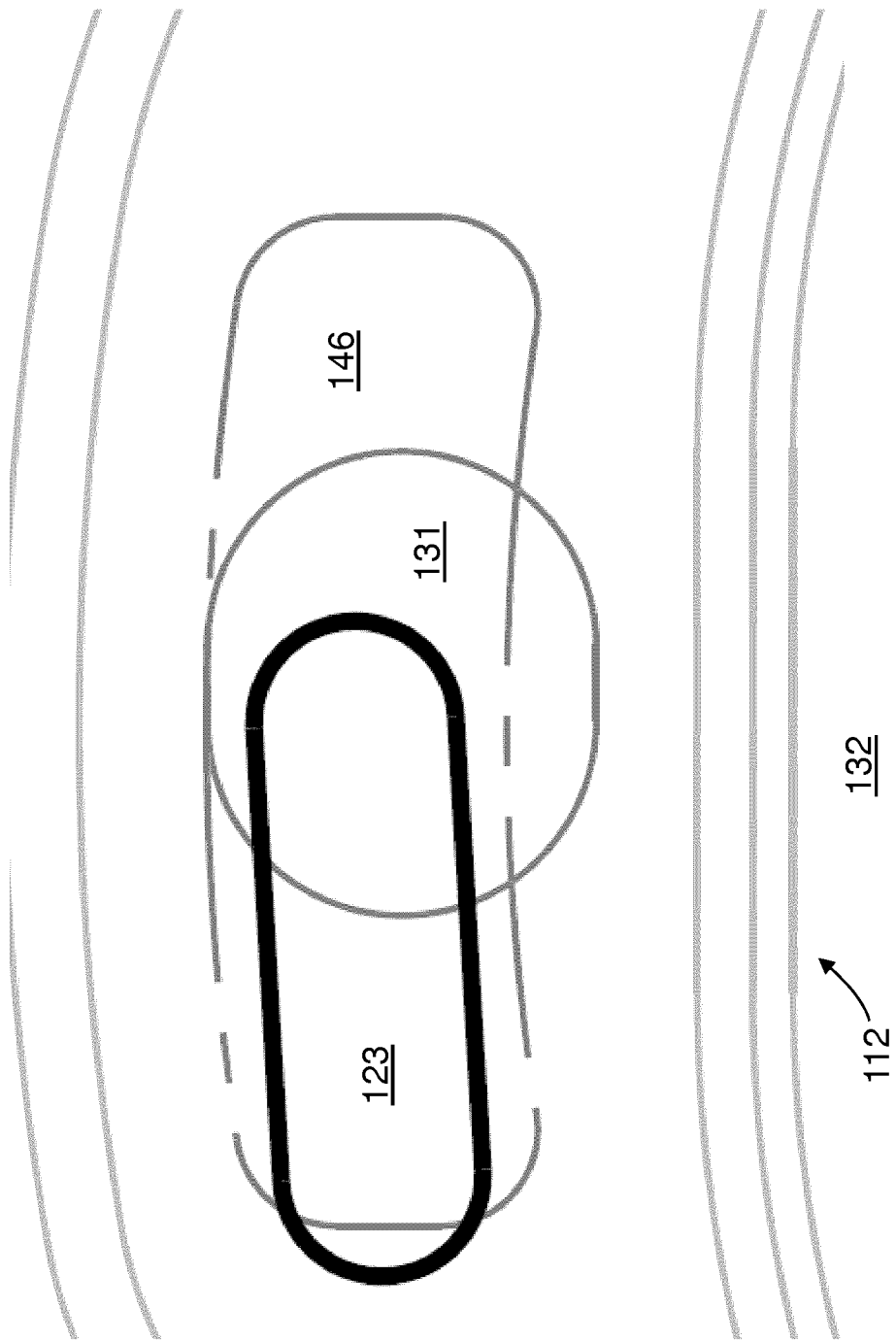
FIG. 1A is an enlarged view of a section of the illustration of FIG. 1, showing a gasket opening in at least partial overlaying relationship with an opening to a casting bore in the cylinder head and in at least partial overlaying relationship with an opening to a casting bore in the cylinder block.
Figure 2:
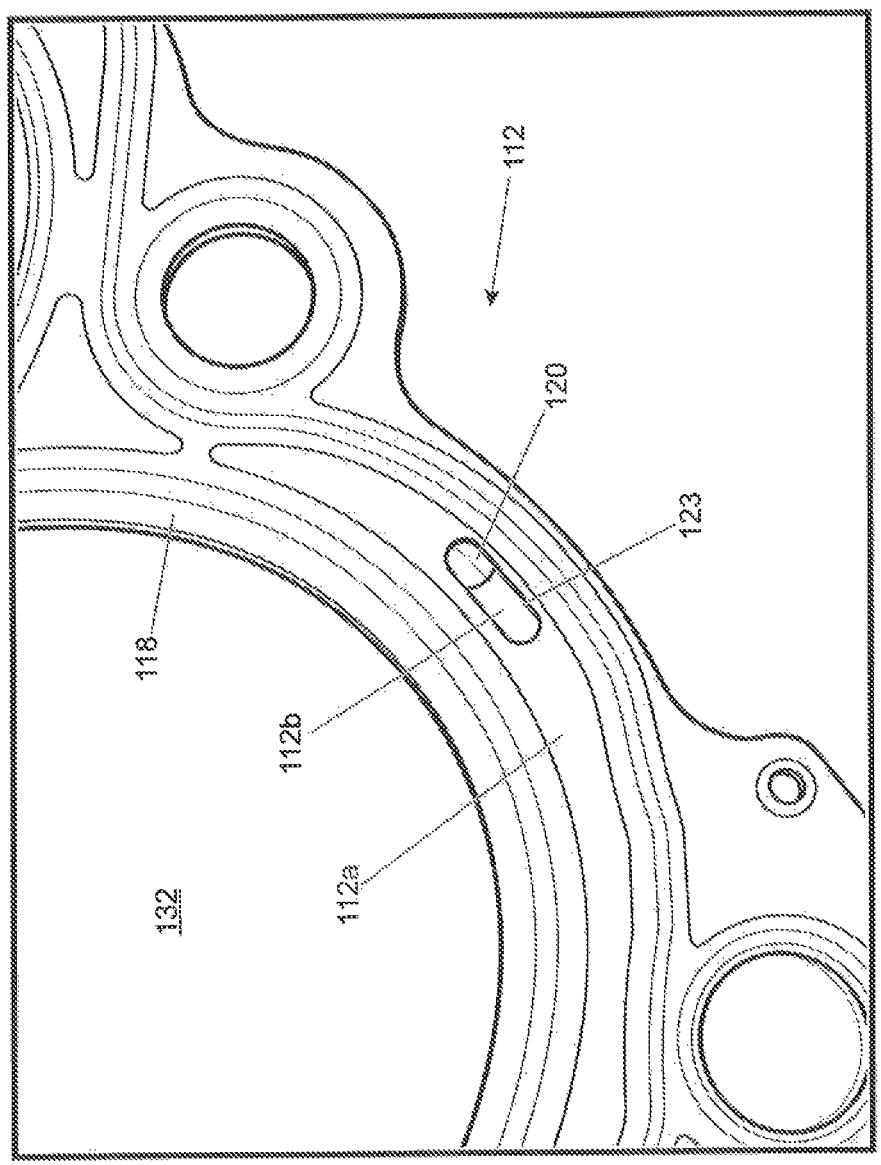
FIG. 2 is an enlarged plan view of a section of the gasket of FIG. 1.
Figure 3:
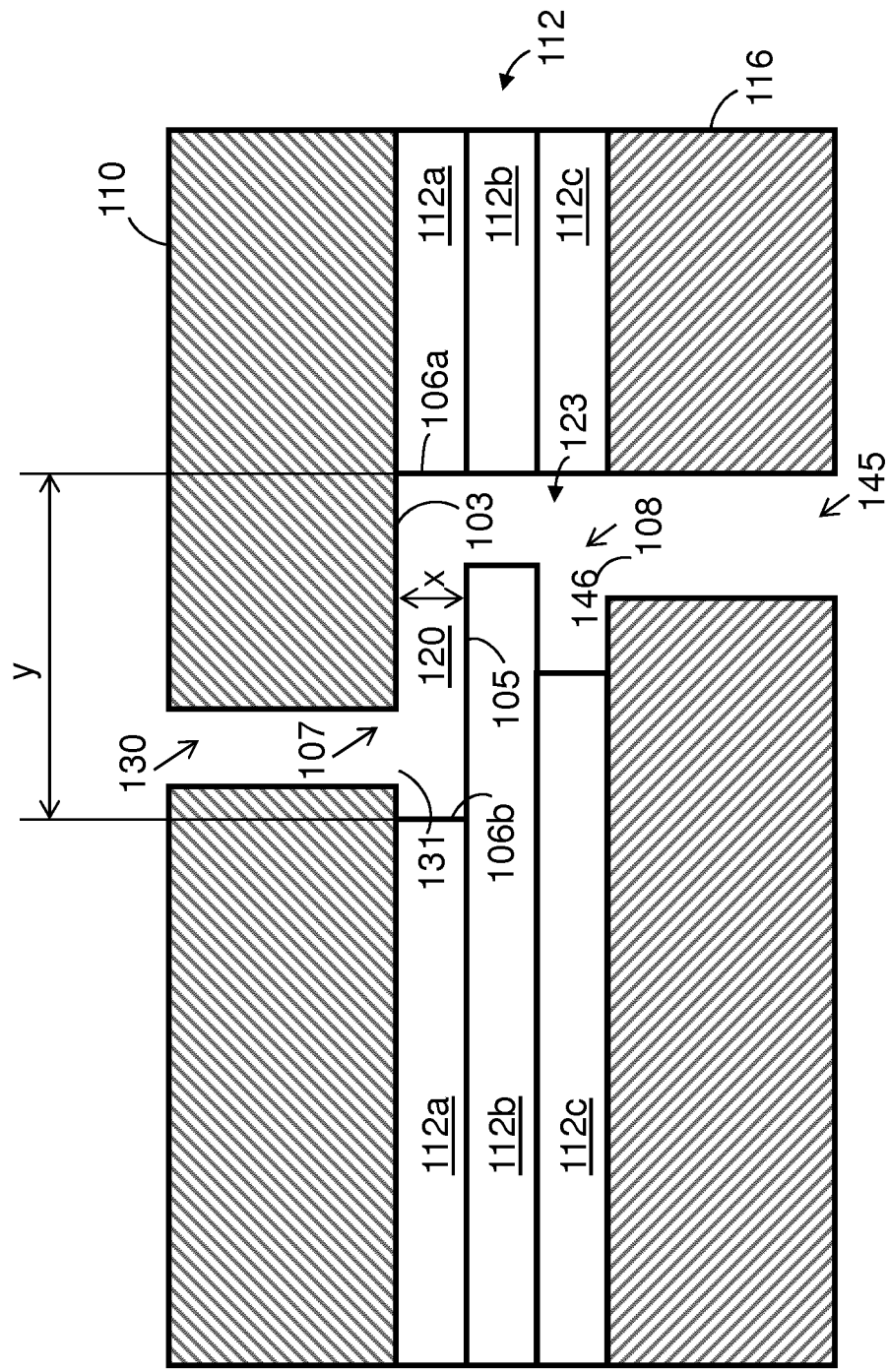
FIG. 3 is a schematic cross-sectional view of the gasket of FIGS. 1, 1A and 2 disposed between a cylinder head and part of a cylinder block.
Figure 4:
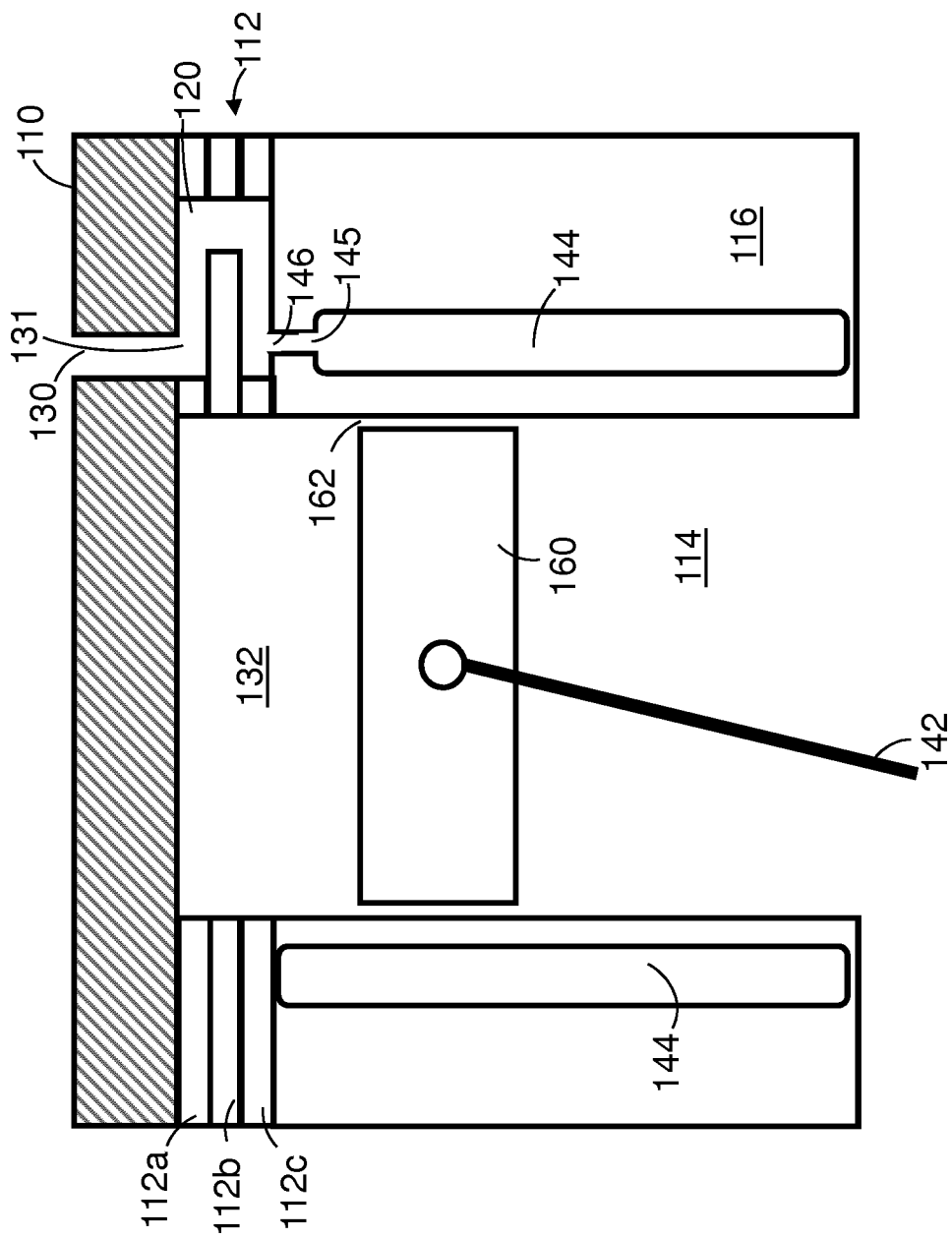
FIG. 4 is a further schematic cross-sectional view of the gasket of FIGS. 1, 1A and 2 disposed between part of a cylinder head and part of a cylinder block.
Figure 6:
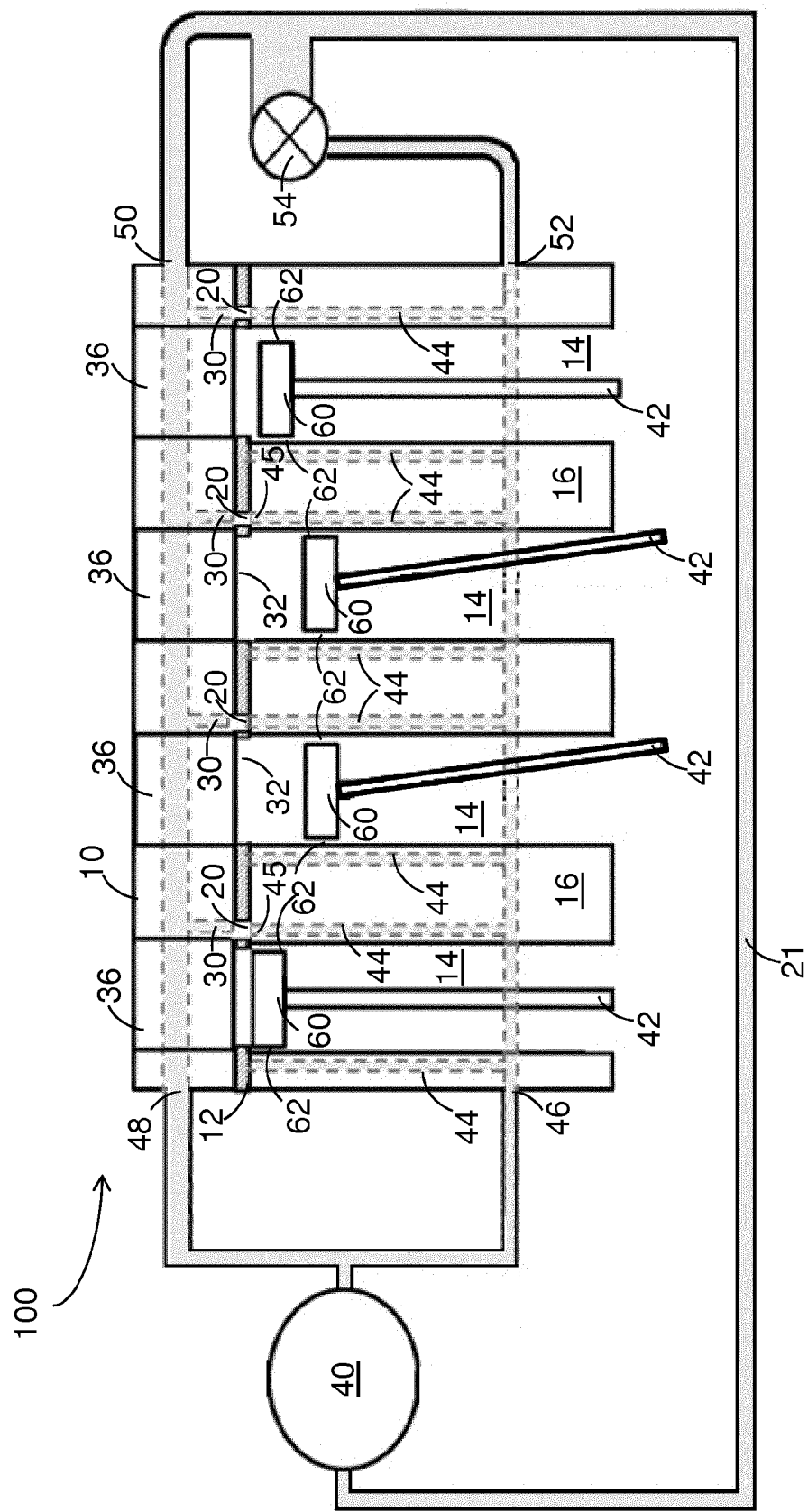
FIG. 6 is a schematic diagram of a temperature management system according to an optional aspect of the disclosure using a gasket according to an aspect of the invention.
Figure 6A:
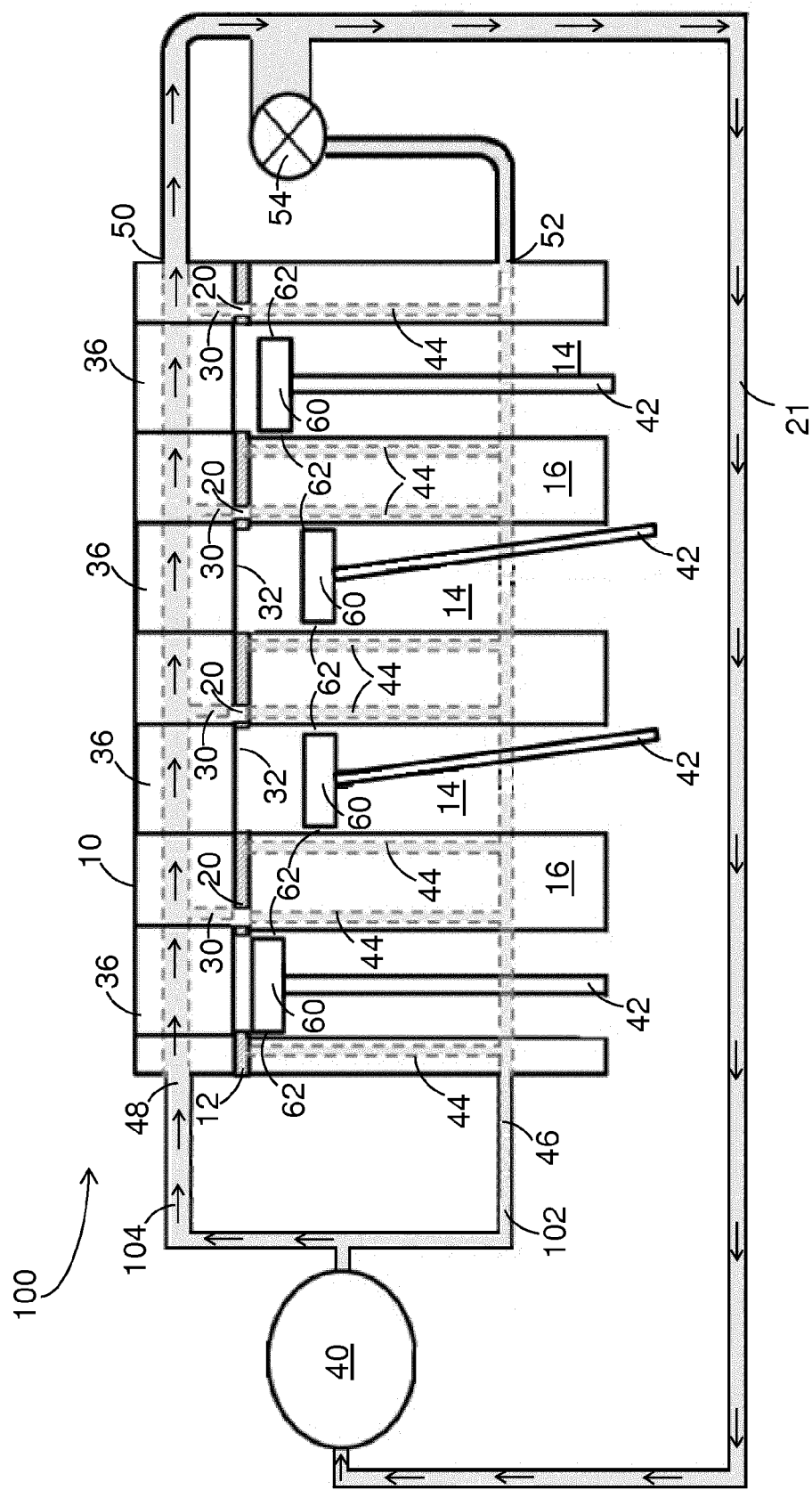
FIG. 6A is the schematic diagram of FIG. 6 wherein coolant flow through a second fluid pathway is additionally highlighted.
Figure 6B:
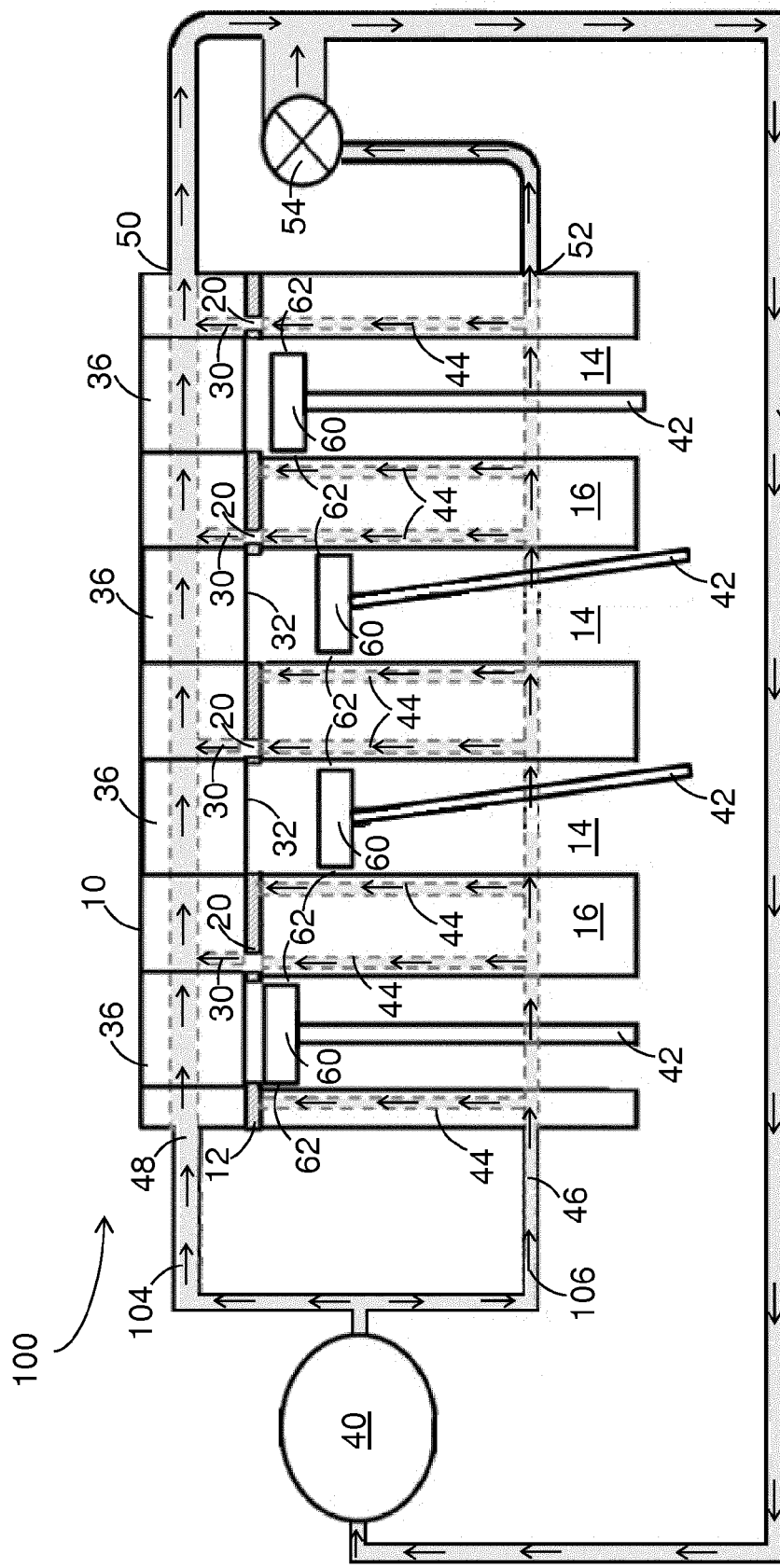
FIG. 6B is the schematic diagram of FIG. 6 wherein coolant flow through both second and third fluid pathways is additionally highlighted (see additional arrows in bores 30 showing the flow of coolant from the cylinder block into the cylinder head).

Referring to FIGS. 1-4 a gasket 112 according to an illustrated embodiment is described. In FIG. 1, part of a gasket 112 is shown in a line drawing, in which a cylinder block 116 and a cylinder head 110 of an internal combustion engine (not shown) are also outlined. In FIG. 2, a view from the top of part of a gasket 112 is shown and schematic cross-sections of the gasket 112 disposed between part of the cylinder block 116 and part of the cylinder head 110 are shown in FIGS. 3 and 4. The cylinder block 116 comprises a water jacket 144 (see FIG. 4), made up of one or more networks of fluid passageways 144 that are cast into the cylinder block 116 and that are disposed about the cylinders 114. The water jackets 144 provide a network of passageways that can contain temperature control fluid, (for example coolant, water or a coolant/water mix). (The passageways 44 are additionally shown in dotted outline in FIG. 6, 6A, 6B, to illustrate that the plane in which the passageways 44 are disposed is not necessarily the same plane as the plane through the cylinder block 16 through which the schematic cross-section of FIG. 6, 6A, 6B is taken).

The gasket 112 optionally comprises one or more layers and in the illustrated gasket 112 of FIGS. 1-4 the gasket 112 comprises three layers: an upper, outer layer 112a; an intermediate layer 112b; and a lower outer layer 112c. The layers 112a, 112b, 112c may be formed from the same material or from different materials. The gasket 112 comprises a series of cylinder openings 132 and sealing elements 118 for sealing about cylinders 114 formed within the cylinder block 116 (see FIG. 2 for the seal 118 and FIG. 4 for the cylinder 114). Formations in one or both outer layers 112a, 112c may be deformable under pressure and the formations (which may be "V"-shaped in cross-section) may provide a seal about the cylinders 114. The gasket 112 comprises means for affixing the gasket 112 to the cylinder head 110 and/or block 116, for example holes or apertures (not shown) integrally formed through the gasket 112 into which bolts or other mechanical fixings can be inserted. The gasket 112 optionally comprises one or more coolant openings 135 provided to couple a primary coolant passageway in the cylinder block 116 with a primary coolant passageway in the cylinder head 110. The gasket 112 optionally additionally comprises one or more oil passage openings 135b.

The gasket 112 additionally comprises one or more gasket openings 123. The openings 123 are provided to connect a bore opening 146 of a "redundant" casting leg or bore 145 formed during the casting process in the cylinder block 116 with another bore opening 131 of a "redundant" casting leg or bore 130 in the cylinder head 110. The "redundant" legs or bores 145, 130 are formed during production of the cylinder head 110 and block 116, which are produced using a casting process. The "redundant" legs or bores 145, 130 are formed as a result of the casting process and may be fluid connected to passages of the cooling system or water jacket 144. The bore or hole 145 in the cylinder block 116 may therefore comprise coolant and/or gas.

Gas may collect in the bore or casting leg 145 in the cylinder block 116 and to prevent its build up, the gas is permitted to bleed out through the gasket opening 123 advantageously provided in the gasket 112 of the present disclosure. The gas can bleed in a controlled way directly into the cylinder head 110 to avoid leakage into the cylinders 114. The one or more gasket openings 123 are therefore sized, shaped and configured to provide a fluid connection between a casting leg opening 146 formed in the cylinder block 116 and a casting leg opening 131 formed in the cylinder head 110 and preferably to permit the free-flow of gas from the block 116 to the head 110. The gasket 112 provides a restricted passageway connecting the redundant casting leg or bore 145 and the redundant casting leg or bore 130. In this way the gasket 112 can be used to control and manage the flow of fluid (gas and liquid) out of the redundant casting leg or bore 145 in the cylinder block 116 and into the redundant casting leg or bore 130 in the cylinder head 110.

During manufacture the size, shape and location of the casting legs 145 in the cylinder block 116 and its opening 146 are subject to tolerances and the exact size, shape and location of the casting leg 145 and its opening 146 in the produced cylinder block 116 is not known until after manufacture. Similarly, the size, shape and location of the casting leg 130 and its opening 131 in the cylinder head 110 are subject to tolerances and the exact size, shape and location of the casting leg 130 and its opening 131 in the cylinder head 110 are not known until after manufacture. Therefore, the opening 131 in the cylinder head 110 may not be aligned with or superimposed exactly above the opening 146 in the cylinder block 116. Indeed, the opening 131 in the cylinder head 110 and the opening 146 in the cylinder block 116 may be off-set from one another and may only partially overlap or indeed not overlap at all. Advantageously, the gasket 112 of the present disclosure is provided with an elongate shaped gasket opening 123 that beneficially enables a fluid connection between a casting leg 145 in the cylinder block 116 and a casting leg 130 in the cylinder head 110 to be made irrespective of the size, shape and location of the casting legs 130, 145 (providing that they are both formed within manufacturing tolerances). This is illustrated in FIGS. 1 and 1A, wherein an elongate opening 123 in the gasket 112 is shown overlapping (or being superimposed on) a substantially circular shaped opening 131 in the cylinder head 110 and an opening 146 in the cylinder block 116 (shown in dash-dot-dash). Due to the general shape of the gasket openings 123 in the gasket 112 being elongated, and/or extended in shape, (for example substantially oval), the opening 123 can provide a fluid connection between potentially off-set (non-aligned) openings 146, 131 in the cylinder block 116 and cylinder head 110.

Further referring to FIG. 3, the opening 123 in the gasket 112 comprises a control gap 120 that comprises an upper wall 103, a lower wall 105 and side walls 106a, 106b. The height 'x' of the control gap 120 may be defined as the (maximum, minimum or average) distance between the upper wall 103 and the lower wall 105. The height 'x' of the control gap 120 is dimensioned to ensure that during certain operating temperatures and coolant flow rates, the viscous drag of coolant passing between the upper and lower walls 103, 105 is significant enough to prevent or at least minimise the flow of coolant out of an upper portion 107 of the gasket opening 123 and into the hole 130 in the cylinder head 110. The control gap opening 123 may have a width 'y' (see FIG. 3). Optionally the width 'y' may be in the range about 2 mm to about 6 mm and preferably, but nevertheless optionally maybe about 4 mm. Optionally, the control gap 120 in the gasket 112 has a cross-sectional shape comprising two parallel straight sides and two opposed semi-circular ends.

Turning now to the structure of the control gap 120, it is preferable that a thin "tunnel" is formed that is significantly longer than it is high (as such the control gap 120 is preferably elongate and optionally substantially oval in cross-sectional shape). In this way a thin film of coolant passes between the solid walls of the control gap 120 and the effects of viscous drag forces are highly effective at restricting the flow of coolant through the control gap 120 and can prevent coolant reaching the casting leg or bore 130 in the cylinder head 110.

In the illustrated arrangement, the upper wall 103 of the control gap 120 is provided by the cylinder head 110. In other embodiments, the upper wall is provided by an upper layer of the gasket 112. In the illustrated arrangement of FIG. 3, the lower wall 105 of the control gap 120 is provided by an intermediate layer 112b of the gasket 112. In other embodiments, the lower wall 105 may be provided by the cylinder block 116 or a lower layer of material of the gasket 112. Preferably, though nevertheless optionally, and as illustrated, the gasket 112 comprises three or more layers 112a, 112b, 112c. The entire structure of the gasket is preferably uniform and multi-layered, however in other envisaged embodiments the gasket is multi-layered at least in the proximity of the gasket opening 123. A first layer 112a is disposed above an intermediate layer 112b and the intermediate layer 112b is disposed above the second layer 112c. The upper wall 103 of the control gap 120 is provided by the cylinder head 110; the side walls 106a, 106b of the control gap 120 are provided by the first layer 112a; and the bottom wall 105 of the control gap 120 is provided by the intermediate layer 112b of material.

The gasket opening 123 has an upper portion 107 and a lower portion 108 and the shape of the gasket opening 123 at one or both of said upper and lower portions 107, 108 is generally elongate in order to fluid connect the at least one bore opening 146 in the cylinder block 116 and the at least one bore opening 131 in the cylinder head 110. In this way, irrespective of the exact location of the block and head openings 146, 131, the gasket opening 123 is shaped, arranged and configured to connect a pair of openings 146, 131. (Albeit the head 110 and block 116 openings 131, 146 must be formed within expected manufacturing tolerances). In the illustrated arrangement of FIG. 3, the upper portion 107 of the gasket opening 123 is elongate in shape. The lower portion 108 of the gasket opening 123 is provided for connecting to the casting leg opening 146 in the cylinder block 116 and is significantly smaller in width than the width 'y' of the control gap 120. Optionally, the casting leg opening 146 is substantially circular in cross-section. In other embodiments, it is envisaged that the gasket opening 123 may be configured oppositely. It is envisaged that in such an embodiment, only the lower portion 108 of the gasket opening 123 is elongate in shape and the upper portion 107 of the gasket opening 123, that is provided for connecting to the casting leg opening 130 in the cylinder head 110, is significantly smaller in width than the width 'y' of the control gap 120 and may be substantially circular in cross-section.

In use, an outer layer 112c of the gasket 112 may be formed such that it is, to some extent, compressed (or its shape changed) when disposed between the cylinder head 110 and the cylinder block 116 (this is so that the gasket 112 can form an effective seal). However, another of the outer layers of the gasket and/or the intermediate layer 112b of the gasket 112 is preferably not compressed. As such, the height 'x' of the control gap 120 is maintained, preferably at less than or equal to about 0.7 mm. Optionally all of the outermost layers 112a, 112c and the intermediate layer 112b of the gasket 112 may be formed from steel and are not compressed.

A further illustrated embodiment of a control gap 220 in a gasket 212 opening 223 is shown in cross-section in FIG. 5A, wherein a control gap 220 of a dual layer gasket 212 is illustrated schematically. The control gap 220 is formed in an upper, outer layer 212a disposed immediately adjacent to the cylinder head (not shown). The gasket opening 223 comprises first and second layers 212a, 212b of material. The first layer 212a is disposed on top of the second layer 212b and the upper wall 203 of the control gap 220 is provided by the cylinder head; the side walls 206a, 206b of the control gap 220 are provided by the first layer of material 212a; and the lower wall 205 of the control gap 220 is provided by an upper surface of the second layer of material 212b.

Optionally, in other envisaged embodiments where the gasket comprises first and second layers of material and the first layer is disposed on top of the second layer, and the upper wall of the control gap is provided by a lower surface of the first layer of material; the side walls of the control gap are provided by the second layer of material; and the lower wall of the control gap is provided by the cylinder block.

In FIG. 5B a single layer gasket 312 is illustrated schematically wherein the control gap 320 is formed as an integral recess within the single layer gasket 312. Optionally, the gasket 312 comprises a single layer of material 312a and the upper wall 303 of the control gap 320 is provided by the cylinder head and the lower wall 305 of the control gap 320 is provided by a recessed portion of the single layer of the gasket material.

In other envisaged embodiments, where the gasket comprises a single layer of material and the upper wall of the control gap is provided by a recessed portion of the single layer of the gasket and the lower wall of the control gap is provided by the cylinder block.

Figure 5C:
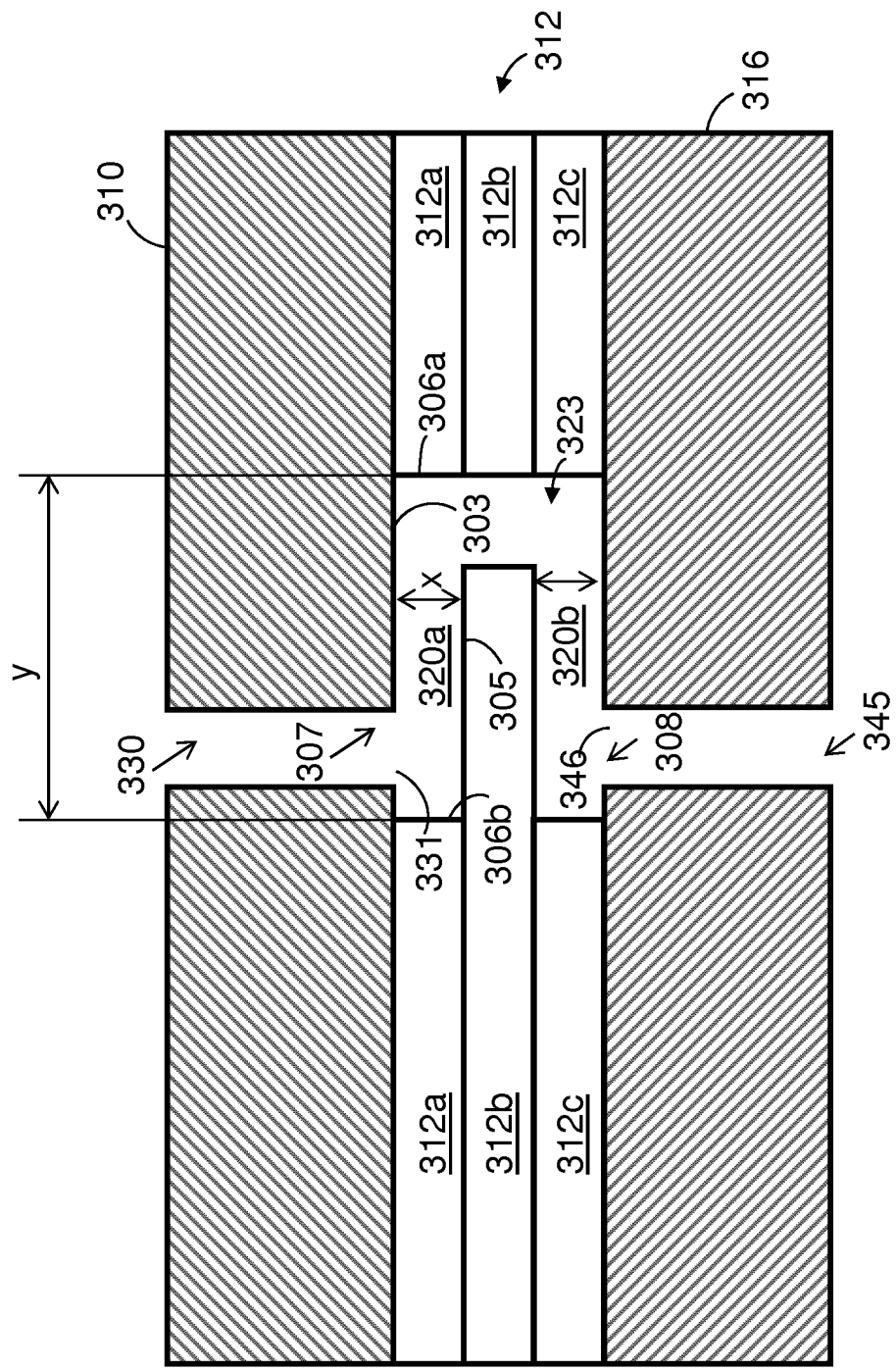
FIG. 5C shows, schematically, in cross-section, a gasket opening with two control gaps in a triple layer gasket according to yet a further embodiment.

In FIG. 5C, another envisaged variation of gasket 312 is shown, wherein the gasket 312 comprises more than one control gap, specifically, two control gaps 320a, 320b. An upper control gap 320a is formed in an upper, outermost layer 312a of a multiple-layered gasket 312. A lower control gap 320b is formed in a lower, outermost layer 312c of the multiple-layered gasket 312. The provision of more than one control gap 320a, 320b may further enhance the gasket's 312 ability to restrict the flow of coolant out of the casting leg 345 of the cylinder block 316 and into a casting leg 330 of the cylinder head 310. In other envisaged gasket arrangements, more than one control gap may be provided and the control gaps may or may not be located within outermost layers of the multiple-layered gasket.

Figure 5D:
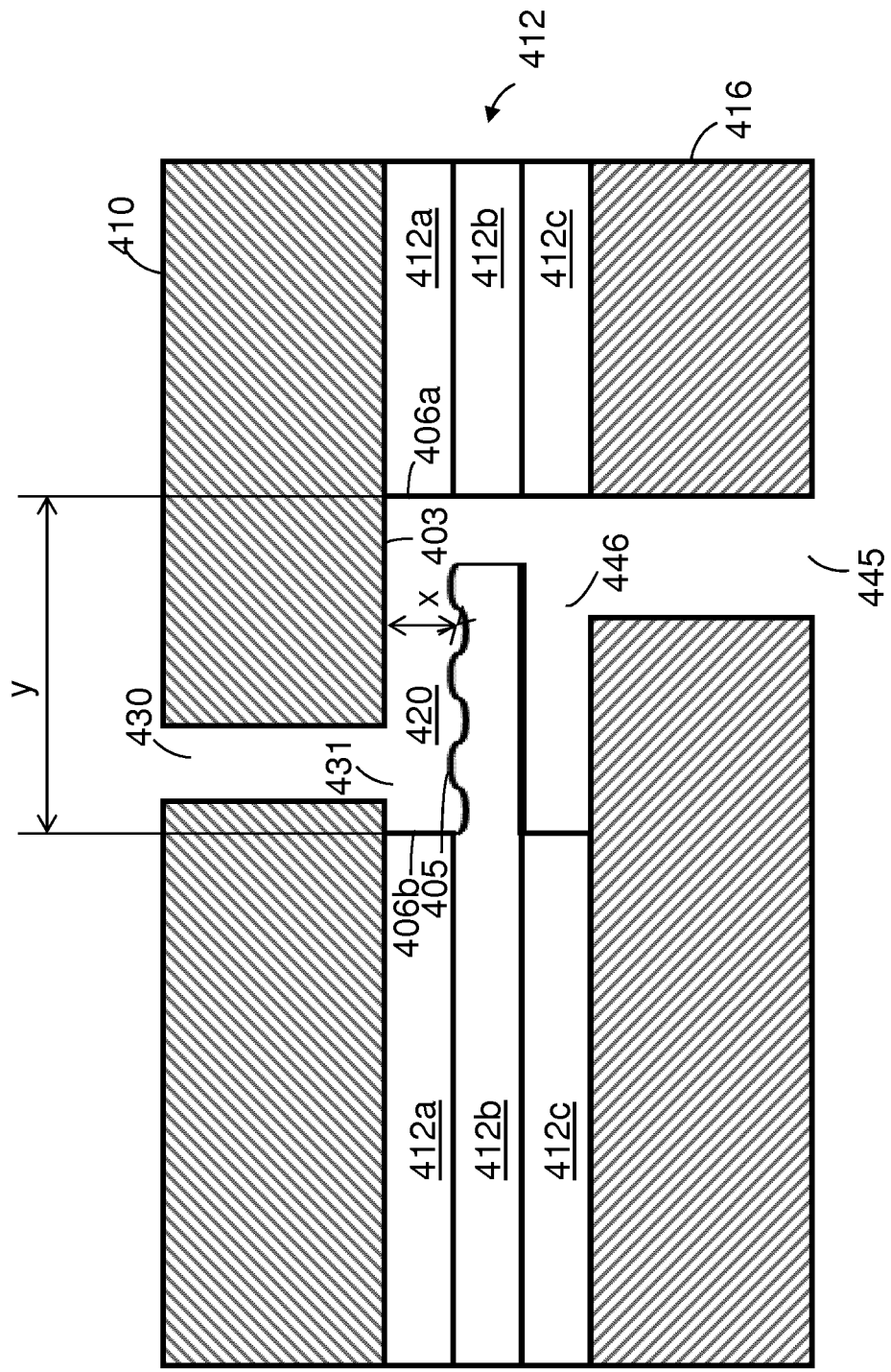
FIG. 5D shows, schematically, in cross-section, a gasket opening and a control gap in a triple layer gasket according to yet an even further embodiment.

In FIG. 5D yet a further envisaged variation of gasket 412 is shown, wherein one or more surfaces of the control gap 420 has been worked, perturbed, made lumpy, formed irregularly, roughened, formed or otherwise finished to further restrict the flow of coolant liquid though the control gap 420. Optionally, a bottom surface 405 of the control gap 420, (which optionally, in a three-layer arrangement may be provided by an upper surface of an intermediate layer 412b) is provided with a series of lumps or bumps, that may or may not be evenly sized and distributed. These lumps or bumps may be referred to as perturbations and may further contribute to inhibiting the flow of coolant through the control gap 420 at low coolant temperatures and/or low coolant flow rates to a sufficient degree that the engine and or one or more of its components can warm up to an optimum operating temperature range more quickly than would otherwise be the case.

The temperature of the engine block 116 increases with use and a cooling system is required to maintain the temperature of the engine within an acceptable operating range. When starting the engine from cold however, lubricant within the engine (for example oil 162 disposed about the pistons 160 moving within the cylinders 114—see FIG. 4), may be at too low a temperature to operate efficiently or optimally. For this and other reasons, it is desirable to allow the engine to warm up quickly. Typically the cooling system is operated as soon as the engine is started and therefore the engine is immediately being cooled. However, it is preferable to delay full operation of the cooling system until after the engine has had sufficient time to reach an optimum operating temperature. To achieve this, the flow of coolant may be slowed or prevented and a water passage opening 135, may be closed blocked or otherwise restricted. In addition, it is advantageous to restrictively control the free-flow of coolant through the casting bore openings 146, 131 using control gap 120, so that the engine can warm-up more quickly. By restricting the free-flow of coolant, the coolant stays within the cylinder block 116 and is heated by operation of the engine. Therefore, lubricant 162 and other components within the engine can warm-up more quickly. Once the engine has warmed up to a satisfactory operating temperature (which may vary between engine designs), the coolant is permitted to freely flow again and indeed is required to do so in order for the cooling system to function effectively in controlling and maintaining the engine temperature within safe limits. At this point the control gap 120 in the gasket 112 can permit coolant flow.

To restrict the flow of coolant during a warm-up phase, the gasket 112 of the present disclosure advantageously comprises the control gap 120. The control gap is formed within the gasket opening 123. The control gap 120 forms a relatively thin passageway which restricts the free-flow of coolant. The boundaries provided by the solid surfaces of the upper and lower walls 103, 105 of the control gap 120 effect the flow of the coolant due to the viscous drag of the coolant liquid as it attempts to pass the walls 103, 105 of the control gap 120. The viscosity of the coolant liquid is sufficiently high, when the engine has a low-temperature, that viscous drag forces are sufficient enough to retain the coolant within the control gap 120 and restrict its free-passage into the cylinder head 110 (via casting leg or hole 130). The viscosity of gases is sufficiently low that gas can nevertheless freely pass though the control gap 120 formed in the opening 123 and gas can therefore bleed though the opening 123 and exit the casting leg 130 in the cylinder head 110 at any flow rate and/or temperature. At higher temperatures, the viscosity of the coolant will drop, the nature of the flow of the coolant may also change and the coolant will be able to freely flow though the control gap 120. This is satisfactory because once the coolant has reached a temperature sufficient for it to flow through the control gap 120, the engine will have "warmed-up" and will have reached its operating temperature. In between the two extremes (no flow of coolant through the control gap 120 and free-flow coolant through the control gap 120), some coolant may be able to leak out of the control gap 120, but a significant restriction is nevertheless placed on the flow of coolant liquid that the engine can warm up more quickly.

In yet a further embodiment of the present disclosure, a temperature management system 100 is provided. Like reference numerals have been used, where possible, to illustrate features that have already been described and numbered in the foregoing description, to denote like features in the following description, albeit the reference numbers may have been reduced by '100' to distinguish those features of the first part of the description from those of the description of the cooling system.

In FIG. 6, there is shown schematically the temperature management system 100 for an internal combustion engine (only partially shown) for a vehicle (not shown). In most operating conditions of the temperature management system 100, the temperature management system 100 will be operating as a cooling system. However, during a first operating mode, also referred to as warm-up phase of the engine, it is not desirable for the temperature management system 100 to operate as a cooling system and the temperature management system 100 in the initial start-up phase is beneficially operated as a temperature maintenance or heating system. The terms cooling system 100 and temperature management system 100 may be used interchangeably throughout, it being understood that cooling system 100 should be interpreted where appropriate to also include a temperature maintenance system and/or a heating system.

The temperature management system 100 is for use in and is integrally formed within a cylinder block 16 (also referred to herein as block) and a cylinder head 10 (also referred to herein as head) of an internal combustion engine. The cylinder block 16 and/or cylinder head 10 may each be cast components, optionally cast from aluminium. The cylinder block 16 comprises one or more cylinders 14 (in the illustrated example four cylinders are provided arranged in an inline four or straight four configuration, in other embodiments other configurations and number of pistons are envisaged) each for housing a piston 60 coupled to a piston rod 42. The pistons 60 are each moveable within the cylinder 14 (as is well known), assisted by lubricant 62, for example oil, that is retained about the piston 60, optionally by one or more piston rings (not shown).

During the first operating condition, or warm-up phase, the internal combustion engine has not yet generated a significant amount of heat and it is not necessary to cool the cylinder block 16 and/or cylinders 14 and/or cylinder head 10 to safe-guard the engine structure. In typical known cooling systems for internal combustion engines the cooling system is driven by the engine and is operated as a cooling system as soon as the engine is started. Beneficially however, the system 100 of the present invention is configured to be adjustably controlled such that during a warm-up phase, the temperature management system allows the engine block 16 and its components (for example the lubricant 62) to retain heat energy generated by the combustion of fuel and thereby allows the cylinders for example, to reach an optimum operating temperature which may be about 70° C. to about 90° C.

To achieve this, the temperature management system 100 comprises a gasket 12 having a control gap 20 (as described above) that is configured to restrict the flow of coolant out of the one or more casting leg, bores or bleed-holes 130, 145, at least during the warm-up phase. The system 100 also comprises a controllable pump 40, configured to have different flow-rate outputs.

The pump 40 is controllable such that during the warm-up phase it out-puts a low or zero flow-rate. The pump 40 can be controlled such that the flow-rate output by the pump can be gradually increased up (for example, by a step-wise adjustment or in more frequent steps such that the change in flow-rate output is almost continuously variable). In this way the pump 40 is controllably and gradually adjustable between a warm-up condition and a maximum cooling condition. In between the warm-up and maximum cooling conditions, the pump 40 may be controllable in a range of states. During the warm-up condition, the pump 40 has a zero or low flow-rate output. During the maximum cooling condition, the pump 40 has a maximum flow-rate. As such, the pump 40 is configured to operate at, at least, two different flow rates, which may be achieved, for example, by physically retarding the pump 40 (using a sleeve disposed over blades or paddles of a centrifugal pump 40); by varying the pumping frequency or varying piston stroke length (in a reciprocating pump); or varying motor speed. Thereby the flow-rate output by the pump 40 is controllable.

Advantageously, at lower flow-rates, the effect of viscous drag forces on the coolant attempting to pass though the control gap 20, 120, 220, 320, 420 of a gasket 12, 112, 212, 312, 412 is increased and together the lower flow-rate output of the variable pump 40 and the control gap 20, 120, 220, 320, 420 have a synergistic effect on restricting the passage of coolant from the block 116 to the head 110 though the gasket 12, 112, 212, 312, 412.

Referring in more detail to FIG. 6, the temperature management system 100 shown therein comprises a first inlet 46 provided in the cylinder block 16 to permit coolant (typically in the form of coolant liquid) to be transferred from the pump 40 into the cylinder block 16. The cylinder block 16 comprises one or more holes or casting legs 45, that in this illustrated arrangement are contiguous with the one or more water jacket passageways 44 formed within the cylinder block 16. A first outlet 52 is provided, optionally on the opposite side of the cylinder block 16 to the first inlet 46. Coolant can exit the one or more water jacket passageways 44 and exit the cylinder block 16 though outlet 52. A valve 54 is provided proximate to the first outlet 52 and in a closed condition the valve 54 can provide a termination of a fluid pathway extending from the pump 40 to the closed valve 54 via the one or more water jackets 44 in the block 16. This fluid pathway is referred to as a first fluid pathway 102.

The cylinder head 10 comprises a further fluid passageway 104 (referred to as a third fluid pathway 104) that allows the coolant to flow from the pump 40, though the cylinder head 10 and return back to the pump 40 via a return pipe 21. The cylinder head 10 comprises a second inlet 48 and a second outlet 50 that are provided so that the coolant can be pumped from the pump 40 into the water jacket formed within the cylinder head 10. The fluid pathway 104 also comprises one or more bleed-holes or casting bores 30.

The gasket 12 is disposed between the cylinder head 10 and cylinder block 16. The gasket 12 comprises a series of sealing apertures 32, (as described above) for sealing about the cylinders 14 and valves 36. The control gaps 20 are each configured and arranged to provide a restrictive passageway between a hole or bore 45 in the cylinder block 16 and an approximately adjacent hole or bore 30 in the cylinder head 10 (as described above). The system 100 may additionally comprise a heat exchanger or radiator (not shown) for extracting heat from the temperature control fluid.

As shown in FIGS. 6A and 6B the system 100 is configured such that three fluid pathways are available:

(i). First fluid pathway 102 (see FIG. 6A): from the pump 40, through the first inlet 46 into the cylinder block 16, into the one or more cylinder jackets 44 comprised in the cylinder block 16 and terminating at the valve 54;

(ii). Second fluid pathway 104 (see FIGS. 6A and 6B): from the pump 40 through a second inlet 48 into the cylinder head 10, into one or more holes or bores or legs 30, out of the cylinder head 10 via the second outlet 50 and returning to the pump 40 via the return pipe 21 (which may pass though the radiator); and (iii). Third fluid pathway 106 (see FIG. 6B): from the pump 40, through the first inlet 46 into the cylinder block 16, though one or more cylinder jackets 44 comprised in the cylinder block 16, out of a first outlet 52 in the cylinder block 16 though the valve 54 and returning to the pump 40 via a return pipe 21 and though the one or more holes or bores 45, though the control gap 20 in the gasket 12 and returning to the pump 40 via part of the second fluid pathway.

The effectiveness of the lubricant 62 in facilitating the sliding movement of the piston 60 within the cylinder 14 is at least in part determined by the temperature of the lubricant 62. As such, during the initial start-up phase which, for example, may be about 5 minutes, the present disclosure advantageously allows for the lubricant 62 to be warmed or heated. To achieve this, the coolant within the water jacket 44 is restricted from flowing during the initial start-up phase. The coolant is not therefore replaced with cooler temperature management liquid recirculating within the system 100 and the temperature management liquid is not cooled by the radiator. To achieve this, the valve 54 is closed and the first fluid pathway 102 is used in conjunction with the pump's 40 lower operating flow-rate. Because the valve 54 is closed, recirculation and flow of the coolant is restricted. Furthermore, at the first lower flow-rate, the control gaps 20 in the gasket 12 are even more effective at preventing the coolant from flowing into the cylinder head 10. This is because at a lower flow-rate (velocity), the effects of viscous drag of the temperature management liquid within the one or more the control gap 20 is greater and is sufficiently strong to prevent the coolant from moving all the way out of the control gap 20. This further ensures that the coolant is not recirculated and thereby is not cooled so that the coolant contained in the one or more water jackets 44 increases in temperature and actually provides a warming jacket (rather than a cooling jacket) about each cylinder 14 at least proximate to the lubricant 62 during the warm-up phase.

Once a preferred temperature for the lubricant 62 is reached and/or after a predetermined time period (for example about 5 minutes), the system 100 is configured to allow the coolant to circulate about the system 100, through the second and third fluid pathways 104, 106 and to be cooled by the radiator such that the coolant operates to cool the engine. The valve 54 is opened and the second and third fluid pathways 104, 106 are utilised.

It can be appreciated that various changes may be made within the scope of the present invention, for example, the advantageous features of the control gap providing a connection between a casting bore in the cylinder head and an approximately oppositely positioned and optionally differently sized leg in a cylinder block may be used in isolation and without other additional beneficial aspects of the invention, for example, the variably controlled pump.

Furthermore, whereas the invention has been described in relation to a control gap for a gasket connecting redundant casting bores, it will be recognised that a control gap according to the present disclosure may be utilised to restrictively or selectively control the flow of other types of liquid and between other types of passageway and other types of application.

In other embodiments of the invention it is envisaged that the cylinder head and/or block may be made from materials other than aluminium, for example steel. In other embodiments of the invention it is envisaged that the cylinder head and cylinder block may be formed from different materials to one another.

In other embodiments it is envisaged that the gasket opening comprises two regions either or both of which may operate as the control gap in dependence upon the relative positioning of the leg opening in the cylinder head and the leg opening in the cylinder block. For example, dependent upon the nature of the off-set between an opening in the head and opening in the block, it may be that a first control gap is effective at stopping the flow of coolant or that a second control gap may be used. In envisaged embodiments, the first control gap may comprise: an upper wall provided by the cylinder head; side walls provided by the first layer; and a bottom wall provided by the intermediate layer of material, and the second control gap comprises: an upper wall provided by the intermediate layer of material; side walls provided by the second layer of material; and a bottom wall provided by the cylinder block.

As used herein the terms "bore", "casting bore", "leg", "casting leg", "hole" and "bleed hole", refer to a formation within the cylinder block and cylinder head. Such formations may be generally cylindrical in cross-sectional shape, may be uniform or non-uniform in diameter and are hollows within which gas and/or coolant may collect. These formations may or may not form part of the water jacket (the network of passageways which forms part of the cooling system) of the cylinder head and cylinder block. In this context where the term "bore" is used, this is distinct from the cylinder in which the piston reciprocates. The cylinder may also be referred to as a cylinder bore or piston bore, either of which terms, may, in some contexts be shortened to bore.

It will be recognised that the gaskets of the present disclosure have beneficial utility in internal combustion engines having a redundant hollow formation which may be a redundant casting bore. The redundant casting bore may result from a casting process where a mould for the cast comprises a leg, prong or protrusion which gives rise to an inverted formation, ie a bore, hole or hollow in the cast cylinder head and/or cylinder block.

The invention claimed is:

1. A gasket for an engine comprising
a gasket body having a gasket opening and being structured with a control gap or being structured to form a control gap when in situ between a cylinder head and a cylinder block, said gasket opening being sized and arranged to provide a fluid pathway between a bore opening in a cylinder block and a bore opening in a cylinder head and said control gap being configured and arranged to selectively restrict the fluid pathway such that gas may freely pass through the gasket opening whereas coolant can only restrictively pass through the gasket opening, wherein
the control gap in the gasket opening comprises an upper wall, a lower wall and side walls, a height of the control gap being defined by a distance between the upper wall and the lower wall and wherein the height of the control gap is dimensioned such that below an engine operating temperature range a viscous drag of coolant passing between the upper and lower walls is significant enough to prevent or at least minimize the flow of coolant out of the gasket opening and into the opening in the cylinder head.

2. A gasket according to claim 1, wherein the height of the control gap is less than or equal to 0.7 mm.

3. A gasket according to claim 2, wherein the height of the control gap is between 0.2 mm and 0.3 mm.

4. A gasket according to claim 1, wherein gasket opening is structured to form the control gap and the upper wall of the control gap is provided by the cylinder head or an upper layer of the gasket and wherein the lower wall of the control gap is provided by the cylinder block or a lower layer of the gasket.

5. A gasket according to claim 4, wherein the upper wall of the control gap is provided by the cylinder head and the lower wall of the control gap is provided by the lower layer of the gasket, wherein the gasket comprises at least three layers, at least in the proximity of the gasket opening, wherein a first layer is disposed above an intermediate layer and the intermediate layer is disposed above a second layer; the side walls of the control gap are provided by the first layer; and the lower wall of the control gap is provided by the intermediate layer of material, the intermediate layer being said lower layer of the gasket.

6. A gasket according to claim 5, comprising a second control gap, wherein the second control gap comprises an upper wall provided by the intermediate layer of material and side walls provided by the second layer of material; and a lower wall provided by the cylinder block.

7. A gasket according to claim 4, wherein the upper wall of the control gap is provided by the upper layer of the gasket and the lower wall of the control gap is provided by the cylinder block, wherein the gasket comprises three or more layers, at least in the proximity of the gasket opening, wherein a first layer is disposed above an intermediate layer and the intermediate layer is disposed above a second layer; the side walls of the control gap are provided by the second layer of material; and the upper wall of the control gap is provided by the intermediate layer of material, the intermediate layer being said upper layer of the gasket.

8. A gasket according to claim 7, comprising a second control gap, wherein the second control gap comprises: an upper wall provided by the cylinder head; side walls provided by the first layer; and a lower wall provided by the intermediate layer of material.

9. A gasket according to claim 7, wherein the upper wall of the control gap is provided by the cylinder head and the lower wall of the control gap is provided by the lower layer of the gasket, wherein the upper layer of the gasket is a first layer and the lower layer of the gasket is a second layer, wherein the first layer is disposed on top of the second layer; the side walls of the control gap are provided by the first layer of material; and the lower wall of the control gap is provided by an upper surface of the second layer of material.

10. A gasket according to claim 4, wherein the upper wall of the control gap is provided by the upper layer of the gasket and the lower wall of the control gap is provided by the cylinder block, wherein the upper layer of the gasket is a first layer and the lower layer of the gasket is a second layer, wherein the first layer is disposed on top of the second layer; the upper wall of the control gap is provided by a lower surface of the first layer of material; and the side walls of the control gap are provided by the second layer of material.

11. A gasket according to claim 1, wherein the gasket opening has an upper portion and a lower portion and wherein the shape of the gasket opening at least at one of said upper and lower portions is generally elongate in order to fluidly connect the at least one bore opening in the cylinder block and the at least one bore opening in the cylinder head; and wherein if only the upper portion or the lower portion of the gasket opening is elongate in shape, the other of the lower or upper portion of the gasket opening is provided for connecting a bore opening in either the cylinder block or head and is at least one of significantly smaller in width than the width of the control gap or substantially circular in cross-section.

12. A gasket according to claim 1, wherein the control gap has a cross-sectional shape that is substantially oval.

13. A gasket according to claim 12, wherein the control gap has a cross-sectional shape comprising two parallel straight sides and two opposed semi-circular ends.

14. A gasket according to claim 1, wherein the width of the control gap is at least twice as great as the height of the control gap.

15. A gasket according to claim 14, wherein the width of the control gap is about ten times as great as the height of the control gap.

16. A gasket according to claim 14, wherein the width of the control gap is between 3 mm and 5 mm.

17. A gasket according to claim 1, wherein
the gasket comprises a single layer of material;
the upper wall of the control gap is provided by the cylinder head and the lower wall of the control gap is provided by a recessed portion of the single layer of the gasket; or,
wherein the upper wall of the control gap is provided by a recessed portion of the single layer and the lower wall of the control gap is provided by the cylinder block.

18. A gasket according to claim 1, wherein any of the upper wall, lower wall and/or side walls is/are textured, formed, shaped, lumped, perturbed or rough.

19. A vehicle comprising an engine having a cylinder block, a cylinder head and a gasket according to claim 1, wherein the gasket is disposed between the cylinder block and the cylinder head, the cylinder block and the cylinder head each comprising at least one bore opening leading to a bore within the cylinder block and cylinder head, respectively.

20. A vehicle according to claim 19, comprising a system for managing temperature of the engine, the system, comprising:
(i) a pump, coupled to the cylinder head and cylinder block for pumping coolant, wherein the pump is controllable such that the flow rate of coolant within the system is adjustable; and
(ii) a valve configured to restrict and permit the flow of coolant through the cylinder block and/or through the cylinder head;
wherein, the pump is controllable to operate at a first flow-rate during a first operating condition and during said first operating condition the valve restricts the flow of coolant through the cylinder block and the control gap of the gasket restricts the flow of coolant out of the cylinder block and thereby the system is configured to enable the engine to reach the engine operating temperature range.

21. A vehicle according to claim 20, wherein the pump has a maximum flow-rate output and wherein the first flow-rate is lower than the maximum flow-rate and/or wherein the engine operating temperature range is between 70° C. and 90° C.

* * * * *